US010274099B2

(12) United States Patent
Michnevitz et al.

(10) Patent No.: US 10,274,099 B2
(45) Date of Patent: Apr. 30, 2019

(54) SPRING ACTUATED THERMAL VALVE (71) Applicant: Emerson Process Management Regulator Technologies Tulsa, LLC, Tulsa, OK (US)

(72) Inventors: Mark A. Michnevitz, Frisco, TX (US); Nathan A. Quinn, McKinney, TX (US); Travis Ellison, Tulsa, OK (US); James Myers, Tulsa, OK (US)

(73) Assignee: Emerson Process Management Regulator Technologies Tulsa, LLC, Tulsa, OK (US)

( * ) Notice: Subject to any disclaimer, the term of this patent is extended or adjusted under 35 U.S.C. 154(b) by 77 days.

(21) Appl. No.: 15/040,877

(22) Filed: Feb. 10, 2016

(65) Prior Publication Data
US 2017/0227137 A1 Aug. 10, 2017

(51) Int. Cl.
*F16K 17/38* (2006.01)
*F16K 31/00* (2006.01)
*F16K 31/12* (2006.01)

(52) U.S. Cl.
CPC .......... *F16K 31/003* (2013.01); *F16K 17/386* (2013.01); *F16K 31/12* (2013.01)

(58) Field of Classification Search
CPC ....... F16K 17/38; F16K 17/383; F16K 17/003
(Continued)

(56) References Cited

U.S. PATENT DOCUMENTS 2,721,571 A * 10/1955 Gershon .................. F16K 13/06
137/75

3,381,933 A * 5/1968 Derhammer .......... F16K 17/003
251/73

(Continued)

FOREIGN PATENT DOCUMENTS

DE           534800 C      10/1931
GB        190916000 A      12/1909

OTHER PUBLICATIONS

International Search Report and Written Opinion, corresponding International Application No. PCT/US2017/01728, dated May 4, 2017.

*Primary Examiner* — Marina A Tietjen
*Assistant Examiner* — Paul J Gray
(74) *Attorney, Agent, or Firm* — Marshall, Gerstein & Borun LLP (57) ABSTRACT A valve includes a valve body forming a channel defining a fluid flow path extending from an inlet port to an outlet port of the valve body via a gallery disposed therebetween, an opening disposed in communication with the gallery, a valve assembly at least partially disposed through the opening and in the gallery, and a set pin having a central longitudinal axis. A valve disc of the valve assembly moves between a first position spaced from a valve seat of the valve body and a second position in contact with the valve seat. The set pin is coupled to and at least partly supported by the valve assembly to maintain the valve assembly in the first position. The fluid flow path allows a fluid to flow through the valve body in a first direction and a second direction opposite the first direction. The set pin is adapted to disengage a portion of the valve assembly when contacted by a fluid traversing the fluid flow path in the second direction, allowing the valve disc to move to the second position.

15 Claims, 5 Drawing Sheets

(58) Field of Classification Search
USPC ....... 137/72, 74, 75, 463; 251/66, 73, 74, 94
See application file for complete search history.

(56) References Cited

U.S. PATENT DOCUMENTS 3,779,262 A   12/1973  Manning et al.
4,116,209 A    9/1978  Greer \* cited by examiner

SPRING ACTUATED THERMAL VALVE

FIELD OF THE DISCLOSURE

The present disclosure generally relates to safety equipment in oil and gas environments and, more particularly, to thermal valves which minimize turbulent flow of fluids travelling therein.

BACKGROUND

In upstream oil and gas supply applications, oil is stored in a variety of storage tanks. During the transport of the oil from the tank to the upstream application, flammable gasses may be generated which are burned off by gas flares or flare stacks. At times, the velocity of vapors flowing towards the flare may be low enough to allow the flame from the flare to travel into the pipe in the opposite direction. Potentially catastrophic failures may occur if the flame is allowed to reach the storage tank.

Additionally, damaging detonations may occur in which the flame rapidly propagates the flow path in a manner resembling a shockwave. These detonations are oftentimes caused by turbulence-creating geometries such as bends, sharp turns, and other interruptions to the flow path.

To mitigate this risk, flame, detonation, and/or deflagration arrestors may be implemented and disposed between the storage tank and the gas flare. In the event that a flame propagates towards the storage tank, these flame arrestors block the flame from further advancing to the storage tank. However, these flame arrestors have a limited useful life and their performance can be compromised upon being exposed to flames for extended periods of time, as each arrestor is designed to withstand a "sustained burn" for a certain period of time. This period of time may be anywhere between minutes to several hours, depending on the arrestor. If a sustained burn lasts longer than the arrestor is rated for, there is a chance that the arrestor will fail if the flow is not shut off to extinguish the flame. Further, these flame arrestors may not be suitable to contain or limit flames caused by detonations due to their rapid propagation. Further still, when employed in remote locations, these devices may be difficult to inspect, thus any degradation in quality may not be realized. In other examples, early detection equipment such as temperature detection sensors and the like are also frequently used in these environments. However, this equipment may experience similar pitfalls due to being positioned in remote locations.

Thermal valves may be implemented to restrict the backwards propagation of gases towards the storage tank by limiting the supply of flame-generating fluids. However, conventional thermal valves may have configurations conducive to generating turbulence along the flow path, which in turn may lead to detonations.

BRIEF DESCRIPTION OF THE DRAWINGS

The above needs are at least partially met through provision of the torsional spring actuated thermal valve described in the following detailed description, particularly when studied in conjunction with the drawings, wherein:

FIG. 5 comprises a schematic front elevation cross-sectional view of an exemplary version of a pin-release thermal valve in accordance with various embodiments of the invention Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

SUMMARY

Generally speaking, pursuant to these various embodiments, systems and approaches for a torsional spring actuated thermal valve are provided and may include a valve body forming a channel defining a fluid flow path extending from an inlet port of the valve body to an outlet port of the valve body via a gallery of the valve body that is disposed between the inlet port and the outlet port. The valve body may further define an opening disposed in communication with the gallery, a valve assembly adapted to be at least partially disposed through the opening and in the gallery of the valve body, and a set pin having a central longitudinal axis.

In one approach, the fluid flow path is adapted to allow a fluid to flow in a first direction and a second direction opposite the first direction. A valve disc of the valve assembly moves between a first position spaced from a valve seat of the valve body and a second position in contact with the valve seat. The set pin is adapted to be coupled to and at least partly supported by the valve assembly in the first position. Further, the set pin is adapted to disengage a portion of the valve assembly when contacted by a fluid traversing the fluid flow path in the second direction to allow the valve disc of the valve assembly to move to the second position.

In some approaches, the valve assembly may include a valve stem coupled to the valve disc. The valve stem may comprise a first telescoping component having a central longitudinal axis and a second telescoping component having a central longitudinal axis aligned with the central longitudinal axis of the first telescoping component and forming at least one catch through a cylindrical surface thereof. In these approaches, the set pin is coupled to a portion of the first telescoping component and is at least partially retained by the catch of the second telescoping component to maintain the valve assembly in the first position.

In an embodiment, the valve assembly may comprise a valve bonnet at least partially covering the opening of the valve body, the valve stem coupled to the valve bonnet, the valve disc coupled to the valve stem, and a valve spring at least partially disposed between the valve bonnet and the valve disc. The valve spring exerts a force on at least one of the valve stem, the set pin, and the valve disc to urge the valve disc toward the second position. The valve spring further causes the valve disc to contact the valve seat upon the set pin disengaging the catch. The valve assembly may be removably disposed within the valve body. In some examples, the valve assembly may be repeatedly secured in the first position by retaining the set pin via the catch of the second telescoping component.

In some embodiments, the set pin is adapted to disengage the catch when the valve assembly is contacted by the fluid to allow the valve disc to move to the second position. A force exerted on the valve assembly by the fluid traversing the fluid flow path in the second direction may be sufficient to move the set pin in a direction generally parallel to the central longitudinal axis of the first component of the valve stem, thereby disengaging the set pin from the catch. In other examples, upon the fluid traversing the fluid flow path in the second direction, the valve spring may expand to cause the set pin to disengage the catch.

In some examples, the set pen comprises a generally cylindrical member disposed generally perpendicular to the central longitudinal axis of the first and/or the second component. The set pin may comprise any one of a spring pin, a dowel pin, fasteners, and the like. Other examples are possible. The set pin may be inserted through at least one opening of the first telescoping component to couple the set pin thereto. In other examples, the set pin is affixed to an outer portion of the first telescoping component to couple the set pin thereto. Other examples are possible. The catch may comprise a blind hole disposed on an inner surface of the second telescoping component. Other examples are possible.

In other embodiments, a valve assembly is provided which may include a valve bonnet adapted to at least partially cover an opening of a valve body, a valve stem coupled to the valve bonnet, a valve disc coupled to the valve stem opposite the valve bonnet, a set pin having a central longitudinal axis, and a valve spring at least partially disposed between the valve bonnet and the valve disc. The valve stem and the valve disc are movable between a first position wherein the valve disc is spaced a first distance from the bonnet and a second position wherein the valve disc is spaced a second distance away from the valve bonnet, whereby the second distance is greater than the first distance. The set pin is adapted to be coupled to and at least partly supported by the valve stem to maintain the valve stem and the valve disc in the first position. The valve spring exerts a force on at least one of the valve stem, the set pin, and the valve disc, thereby urging the valve stem and the valve disc into the second position. Upon the set pin disengaging a portion of the valve stem, the valve spring is adapted to cause the valve stem and the valve disc to move to the second position.

The valve stem may comprise a first telescoping component having a central longitudinal axis and a second telescoping component having a central longitudinal axis aligned with the central longitudinal axis of the first telescoping component and forming at least one opening on a cylindrical surface thereof. In these examples, the set pin is coupled to a portion of the first telescoping component to maintain the valve assembly in the first position. In some approaches, the central longitudinal axis of the set pin is adapted to be substantially perpendicular to the central longitudinal axes of the first and second telescoping components when the set pin is at least partly supported by the valve stem.

So configured, the valve assembly and other components are substantially removed from the fluid flow path, thus creating a smoother flow, which in turn reduces turbulence and the occurrence of detonation events. In these examples, it is understood that the thermal valve will be used on an unprotected side of a flame arrestor commonly used in existing systems. While the thermal valve may not prevent all flames from progressing to the flame arrestor, the valve's closure will ultimately shut off the remaining gas flow which will result in the flame burning out. Further, upon the occurrence of a deflagration event in which the set pin disengages the catch, the valve assembly may be easily reset by repositioning the set pin to engage the catch. Additionally, because portions of the valve assembly may be a unitary design inserted into the opening of the valve body, it may be easily replaceable should components be damaged beyond repair by a deflagration event.

DETAILED DESCRIPTION

Figures 1A, 1B:
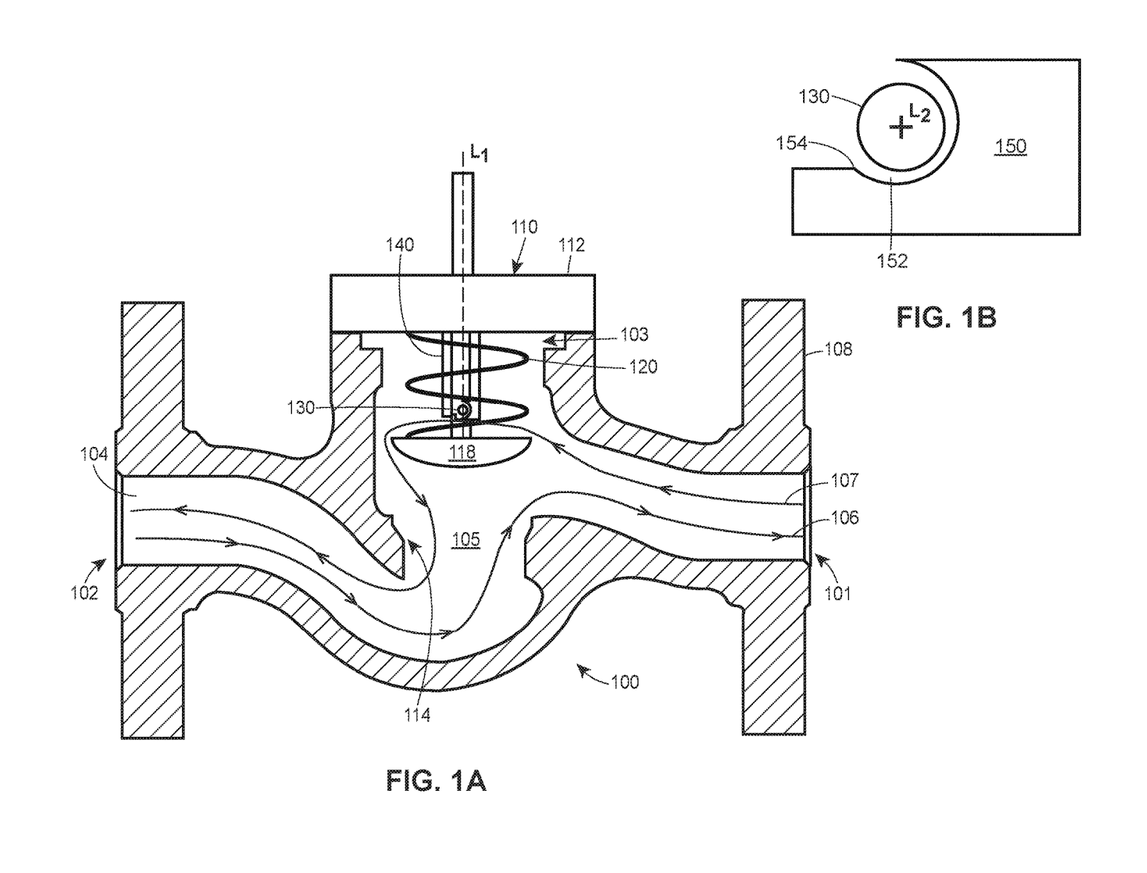
FIG. 1A comprises a schematic front elevation cross-sectional view of an exemplary torsional spring actuated thermal valve in accordance with various embodiments of the invention.
FIG. 1B comprises an enlarged cross-sectional view of exemplary set pin and telescoping component of FIG. 1a in accordance with various embodiments of the invention.
Figure 2:
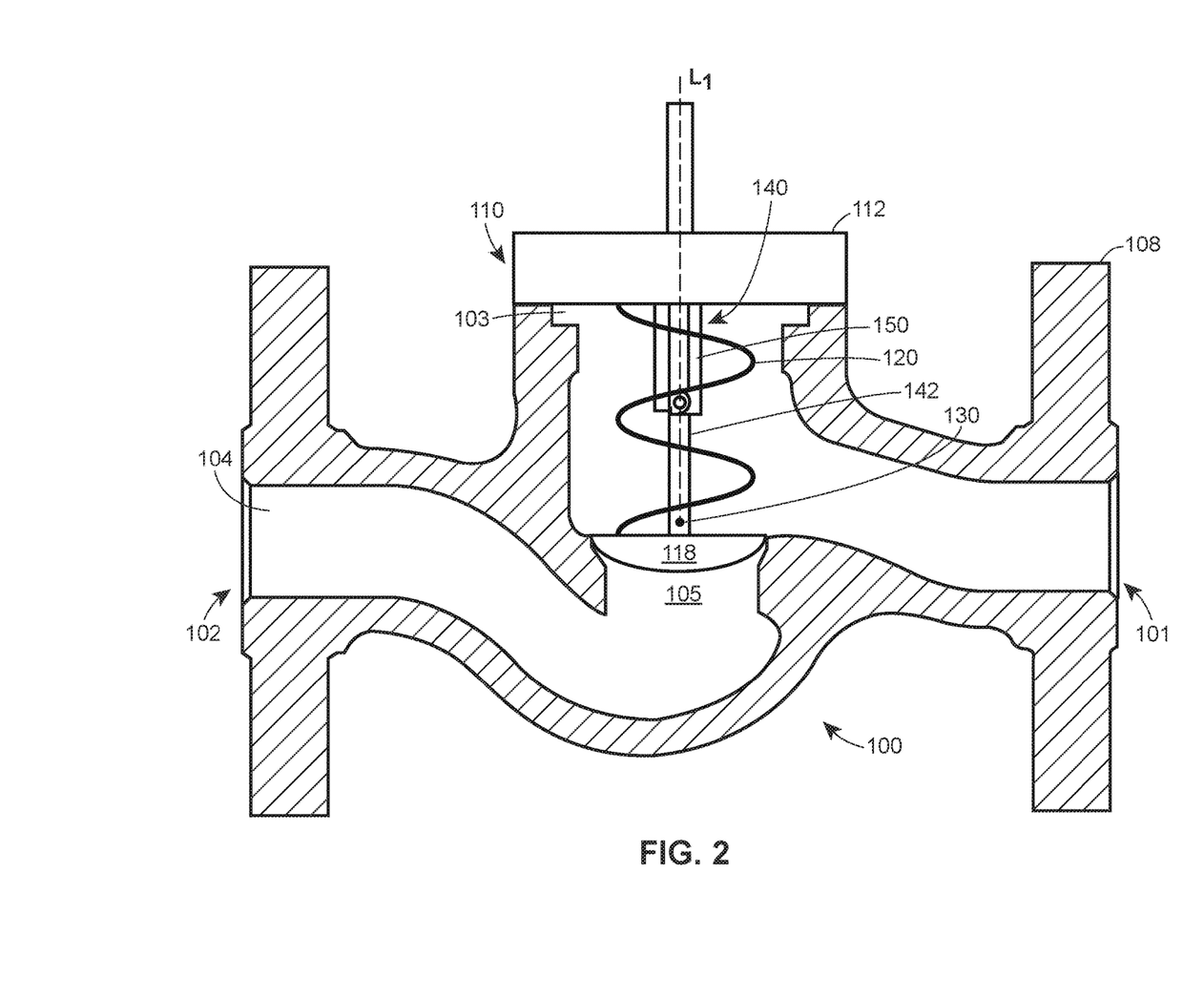
FIG. 2 comprises a schematic front elevation cross-sectional view of the exemplary torsional spring actuated thermal valve of FIG. 1A in an activated position in accordance with various embodiments of the invention.

Referring now to the drawings, and in particular to FIGS. 1A, 1B, and 2, a valve 100 for an oil and gas tank is provided. The valve includes a valve body 108, a valve assembly 110, and a set pin 130. The valve body 108 forms a bonnet opening 103 and further forms a channel 104 which defines a fluid flow path extending from an inlet port 101 of the valve body 108 to an outlet port 102 of the valve body 108 via a gallery 105. The fluid may flow along the channel 104 in a first direction 106 (e.g., from the inlet port 101 to the outlet port 102) or a second direction 107 (e.g., from the outlet port 102 to the inlet port 101). The valve 100 also forms a valve seat 114 located in the gallery 105.

Generally speaking, the valve 100 is adapted to be disposed between a storage tank and flame arrestor (not shown) and upstream components (not shown) for use and/or processing. The valve body 108 may be constructed of any number of metallic materials and is formed using any number of methods, such as, for example, extruding, forging, and the like. Other examples are possible. It is understood that the valve 100 may include any number of additional components not described herein for the sake of brevity.

It is understood that by the term "fluid" and as described herein, it is meant any suitable liquids and/or gases which may be stored and utilized in oil and gas applications. For example, suitable fluids may include Group D gases such as methane, propane, and/or natural gas. Other examples are possible. These fluids may generate flames or deflagration events upon experiencing a substantial amount of turbulent flow. Other examples are possible.

The valve assembly 110 may include a valve bonnet 112 adapted to at least partially cover the bonnet opening 103 of the valve body 108, a valve stem 140, a valve disc 118, and a valve spring 120. The individual components of the valve assembly 110 may be constructed of any number of suitable materials, such as, for example, metals, metal alloys, polymers, and the like. Other examples are possible.

In some examples, the valve bonnet 112 is a generally planar component which may serve as a partial or complete seal to the bonnet opening 103. The valve bonnet 112 may be coupled to the valve body 108 using any number of components such as, for example, nuts, bolts, screws, clamps, and the like. Other examples are possible.

The valve stem 140 may be coupled to the valve bonnet 112 using any number of suitable components and techniques. The valve stem 140 may have a central longitudinal axis L1 and may include at least one opening extending along a lateral axis L2 which is transverse to the longitudinal axis L1. In the disclosed versions, the lateral axis L2 is approximately perpendicular to the central longitudinal axis L1 of the valve stem 140. The valve stem 140 is adapted to move between a first position (FIG. 1A) and a second position (FIG. 2) via any number of components.

As will be described, the first position may be described as a "loaded" position and the second position may be described as an "activated" position. For example, the valve stem 140 may comprise a telescopic tube element including a first telescoping component 142 (also referred to as an "inner tube") slidably disposed within a second telescoping component 150 (also referred to as an "outer tube"). In the disclosed embodiment, the outer tube 150 is fixed to the valve bonnet 112 and the inner tube 142 is axially displaceable relative to the outer tube 150, as will be described. In other versions, the inner tube 142 can be fixed to the valve bonnet 112 and the outer tube 150 could be slidably displaceable relative to the inner tube 142 and the valve bonnet 112. In still other versions, the valve stem 140 may include more than two telescoping components (also referred to as "tubes") while achieving the same desired purpose.

In this example, the inner tube 142 and the outer tube 150 have a common central longitudinal axis L1. The inner tube 142 is dimensioned such that it may be inserted into the outer tube 150. In some examples, the inner tube 142 may have an outer diameter of approximately 5 to 15 millimeters, and more specifically, approximately 11 millimeters. Furthermore, the outer tube 150 may have an inner diameter of approximately 7 to 17 millimeters, and more specifically, approximately 13 millimeters. Other examples are possible. Further, the outer tube 150 may have an opening 117 along the lateral axes L2 which corresponds with a portion of the inner tube 142 when the valve stem 140 is in the first, loaded position. Other examples are possible. In some examples, the inner tube 142 may have an opening or indentation for inserting the set pin 130.

The valve seat 114 is at least partially formed by the valve body 108 and is disposed between the inlet port 101 and the outlet port 102 of the valve body 108. In some examples, the valve seat 114 may be a ledge or platform having a cross sectional shape identical or similar to that of the channel 104. It is understood that the valve seat 114 may be an integral component of the valve body 108 or may include separate components such as a seat ring attached to the valve body 108 using any number of methods such as threads, screws, and the like. Other examples are possible.

The valve disc 118 is adapted to be coupled to the valve stem 140 and, in particular, a distal end of the inner tube 142 of the disclosed valve stem 140. The valve spring 120 is adapted to be at least partially disposed between the valve bonnet 112 and the valve disc 118 and is adapted to exert a force (denoted by "F" in the drawings) on at least one of the valve stem 140, the set pin 130, and the valve disc 118. In the disclosed version, the valve spring 120 exerts a downward force on the valve disc 118 and inner tube 142 of the valve stem 140, which in turn applies a shear load to the set pin 130 as will be described.

The set pin 130 or link may be any type of generally cylindrically shaped and thus have a generally circular cross sectional area. It is understood that any cross sectional shape may be used as desired. The set pin 130 may be constructed of any number of materials (e.g., stainless steel or other high-temperature metals) and may be chosen based on the material's physical properties such as melting point, shear strength, bending resistance, etc. In some examples, the set pin 130 comprises a spring pin which may include a slot running along a portion of its longitudinal length. In other examples, the set pin 130 may comprise either a hollow or solid dowel pin. Other examples are possible.

Figure 3A:
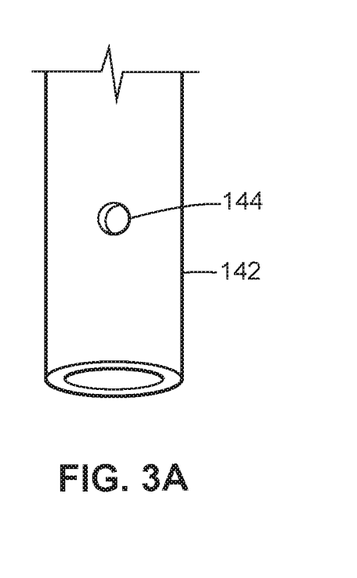
FIGS. 3A & 3B comprise schematic perspective views of a set pin coupled to an inner telescoping component of the exemplary torsional spring actuated thermal valve of FIGS. 1A and 2 in accordance with various embodiments of the invention.
Figure 3B:
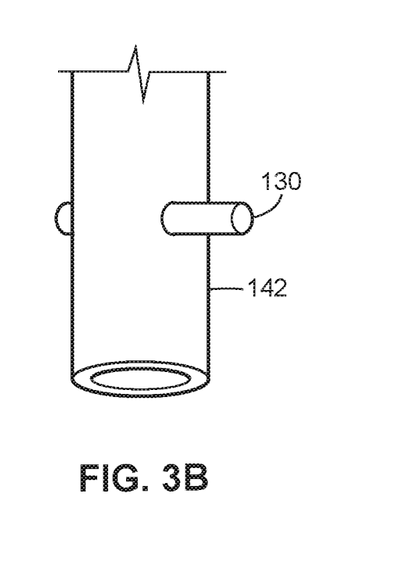

The set pin 130 may be coupled to the inner tube 142 of the valve stem 140 via any number of suitable methods. As illustrated in FIGS. 3A & 3B, the inner tube 142 may include at least one indentation or opening 144 on an outer surface thereof which is aligned with the lateral axis L2. The set pin 130 may be partially inserted into the indentation 144 to couple the set pin 130 to the inner tube 142. This coupling between the set pin 130 and the inner tube 142 may be a threaded connection, a press-fit connection, or any other suitable connection. In some examples in which the inner tube 142 includes an opening through a portion thereof, the set pin 130 may be inserted through the opening 144. It is understood that any number of set pins 130 may be used as desired depending on the number of indentations 144 contained on the inner tube 142. For example, in embodiments having two indentations 144 on opposing sides of the inner tube 142, two set pins 130 may be used.

As illustrated in FIGS. 1A & 4A-4D, the outer tube 150 may include an opening or openings 152 which align with the lateral axis L2 when the valve stem 140 is in the loaded position. The opening 152 may include a catch region 154 which acts to restrict movement of the inner tube 142 and the set pin 130 from moving along the lateral axis L1 relative to the outer tube 150. In some examples, the opening 152 may extend completely through the shell of the outer tube 150, but in other examples, the opening 152 may comprise a blind hole or opening disposed on an inner surface of the outer tube 150. As Illustrated in FIGS. 4A-4D, the opening 152 may be formed in any number of configurations. The opening 152 may comprise a circumferential region of the outer tube 150, which may cause the outer tube to have a protruding end that lacks a generally uniform and/or cylindrical design.

In operation, and as illustrated in FIG. 1A, valve stem 140 and valve disc 118 are moved to the first position, which causes the valve spring 120 to compress. The set pin 130 is coupled to the inner tube 142 and moved into the opening 152 of the outer tube 150. As a result, the set pin 130 therefore resides along the lateral axis L2 which in the disclosed example is generally perpendicular to the longitudinal axis L1 of the valve stem 140 to restrict movement of the inner tube 142 and valve disc 118 relative to the outer tube 150. Because the valve spring 120 is in a compressed state, the set pin 130 is urged in a direction along the lateral axis L1. The set pin 130 contacts a lower peripheral edge portion of the catch region 154 which exerts a reactionary force on the set pin 130. These combined forces will in turn maintain the set pin 130 within the opening 152 as well as the valve assembly 110 in the first or "loaded" position. Accordingly, the valve assembly 110 is maintained in this loaded position without the valve stem 140, set pin 130, or valve spring 120 interacting with, contacting, or bearing against portions of the valve body 108 for support. The valve bonnet 112, the valve stem 140, the valve disc 118, and the valve spring 120 may then be inserted into the bonnet opening 103 of the valve body 108 and coupled thereto via the valve bonnet 112.

When the valve assembly 110 is in the first position, fluid may move freely along the first fluid flow path 106. This is because the valve assembly 110 is spaced away from the valve seat 114 and substantially out of the fluid flow path 106. Said another way, a substantial part of the fluid flow path through the gallery 105 of the valve body 108 where the valve assembly 110 is in the first position is entirely free of physical obstructions. The first direction 106 of the fluid flow path may be used to transport fluids from the storage tank to upstream components for use and/or processing. When a fluid moves along the fluid flow path in the first direction 106, the set pin 130 remains substantially out of contact with the fluid. In some embodiments, a substantial portion of the components in the valve assembly 110 also remain out of contact with the fluid during movement along the first direction 106. As such, the fluid flow is smooth and generally free of interruptions and/or bends which may create turbulent flow. It is understood that in some embodiments, the fluid moving along the first fluid flow path 106 may contact any or all of the set pin 130 and any number of components in the valve assembly 110, but the fluid travel may still remain generally free of turbulence.

As illustrated in FIG. 2, in the event of a deflagration event in which a flame and its corresponding fluids travel back towards the storage tank and into the valve 100 in the second direction 107 of the fluid flow path, the fluid may contact the set pin 130. Generally speaking, forces exerted on the set pin 130 and the other components of the valve assembly 110 cause the set pin to disengage the catch region 154. Upon disengaging the catch region 154, the force exerted by the spring 120 will cause the valve assembly 110 to move from the first position to the second position.

When a portion of the valve assembly 110 moves to the second, activated position, the inner tube 142 moves axially relative to the outer tube 150 such that the valve disc 118 contacts the valve seat 114 and creates a seal which restricts fluids from propagating beyond the valve seat 114 in the second direction 107. In the disclosed version and as illustrated in FIG. 2, the inner tube 142 slides partly out of the outer tube 150 as the valve stem 140 moves from the first position to the second position. As a result, while an amount of fluid and/or flame may have propagated beyond the valve stem 114 before the valve assembly 110 moved to the second position, the flame will eventually burn out due to a lack of fluid supplied thereto. Further, in some examples, when the valve assembly 110 is in the second position, movement along the fluid flow path in the first direction 106 may also be restricted.

In some examples, the force of the fluid propagating the fluid flow path in the second direction 107 may be sufficient to "lift" the set pin 130 out of the catch region 154 and cause the set pin 130 to disengage the opening 130, which in turn will cause the valve assembly 110 to move to the second position. In other examples, the valve spring 120 may be constructed of a material which expands when experiencing the increased temperatures associated with the deflagration event. This expansion may be sufficient to cause the set pin 130 to rotate and disengage the catch region 154, thus causing the valve assembly 110 to move to the second position.

Because the first direction 106 and the second direction 107 contain a minimal number of changes in overall direction, interruptions, edges, and/or other flow-disturbing components, the chances of generating turbulent flow are minimized. As a result, even in the event of a deflagration event in which a fluid is propagating in the second direction 107, the likelihood of creating a potentially catastrophic detonation event is substantially reduced. Further, despite portions of the valve assembly 110 being disposed at a position which may be contacted by a fluid propagating in the second direction 107, the occurrence detonation events remains unlikely.

Since the valve assembly 110 may be readily coupled together, it is possible to easily reset the set pin 130 as well as easily replace damaged components. For example, in the event that a deflagration event occurs in which a fluid propagates in the second direction 107, while the set pin 130 may have disengaged the catch region 154, the valve assembly 110 may be reset by removing the valve bonnet 112, the valve stem 140, the valve disc 118, and the valve spring 120 by decoupling the valve bonnet 112 from the valve body 108. The valve stem 140 may then be reset in the first "loaded" position by engaging the set pin 130 to the opening 152 of the outer tube 150. The valve assembly 110 may then be reinserted into the bonnet opening 103 of the valve body 108.

Figure 4A:
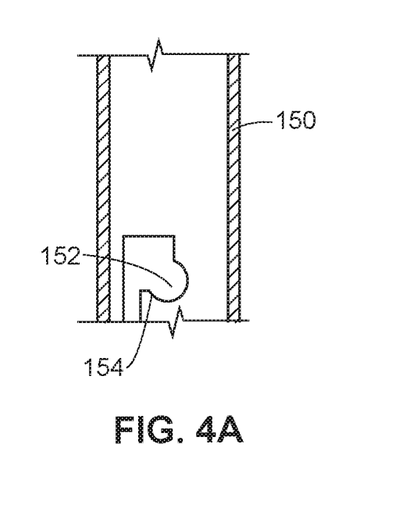
FIGS. 4A-4D comprise schematic front elevation cross sectional views of an outer telescoping component of the exemplary torsional spring actuated thermal valve of FIGS. 1A and 2 in accordance with various embodiments of the invention.
Figure 4B:
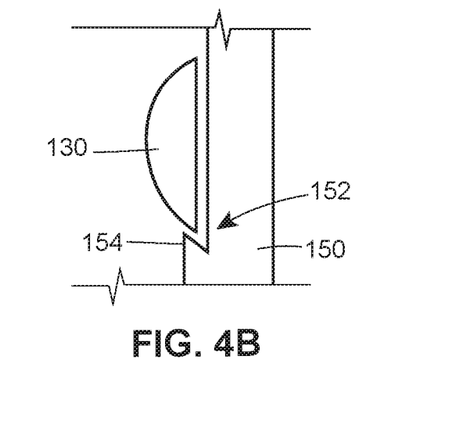

Turning to FIGS. 4A-4D, various approaches for engaging the set pin 130 to the outer tube 150 are provided. As previously described, in FIG. 4A, the set pin (not shown) rests in the opening 152 and is constrained by the catch 154. It is understood that the opening 152 may be of any suitable size, length, and/or configuration. In FIG. 4B, the set pin 130 is at least partially semi-cylindrical in length and again rests in the opening 152 and is constrained by the catch 154. In this example, when the valve assembly is in the loaded position whereby the set pin 130 is constrained by the catch 154, the center of gravity of the set pin 130 is located at a position that causes the set pin 130 to be maintained in the loaded position. When the valve spring 120 is contacted by the fluid propagating the fluid flow path in the second direction 107, the valve spring 120 may contact the set pin 130, causing it to pivot off of the center of gravity thereby releasing the set pin and causing the valve assembly to move to the activated position.

Figure 4C:
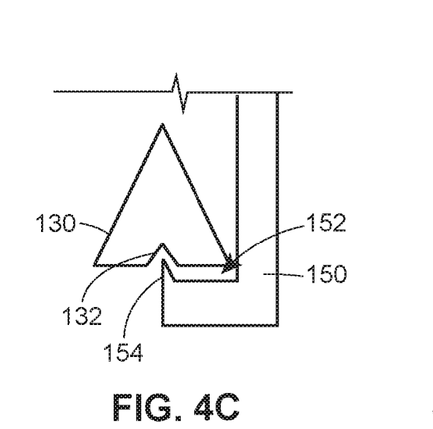

As shown in FIG. 4C, the set pin 130 is at least partially triangular in length. The set pin 130 includes a notch 132 which corresponds to the catch 154 of the outer tube 150. Similar to previous examples, when the valve assembly is in the loaded position whereby the notch 132 is constrained by the catch 154, the center of gravity of the set pin 130 is located at a position that causes the set pin 130 to be maintained in the loaded position. When the valve spring 120 is contacted by the fluid propagating the fluid flow path in the second direction 107, the valve spring 120 contacts the set pin 130, causing it to pivot off of the center of gravity thereby releasing the set pin 130 and causing the valve assembly to move to the activated position.

Figure 4D:
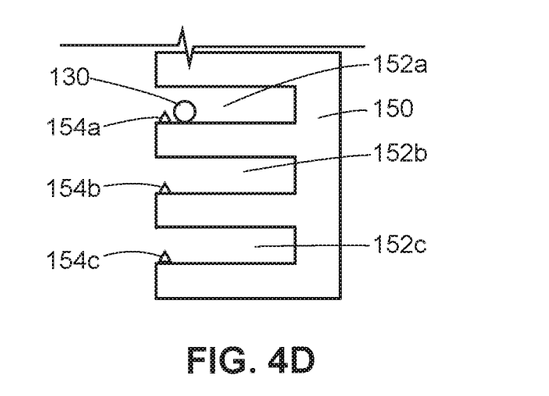

In other examples, and as illustrated in FIG. 4D, the outer tube 150 may include a number of indentations or steps which form a number of openings 152a, 152b, 152c which act to provide variable height settings. It is understood that any number of indentations may be formed in the outer tube 150 as desired. The openings 152a, 152b, 152c may have catches or bump stops 154a, 154b, 154c disposed on the ends thereof for retaining the set pin 130. In some examples, the catches 154a, 154b, 154c may be deformable and/or resilient to allow the set pin 130 to move into the openings 152a, 152b, 152c. In other examples, the catches 154a, 154b, 154c may be rigid and thus the set pin must be deformed or dimensioned appropriately to enable entry into the openings 152a, 152b, 152c. The set pin 130 may be inserted into any one of the openings 152a, 152b, 152c to selectively adjust the position of the valve assembly when in the loaded position. In these examples, when the valve spring 120 is contacted by the fluid propagating the fluid flow path in the second direction 107, the valve spring 120 causes the set pin 130 to move out of the opening 152a, 152b, 152c thereby releasing the set pin 130 and causing the valve assembly to move to the activated position.

Figure 5:
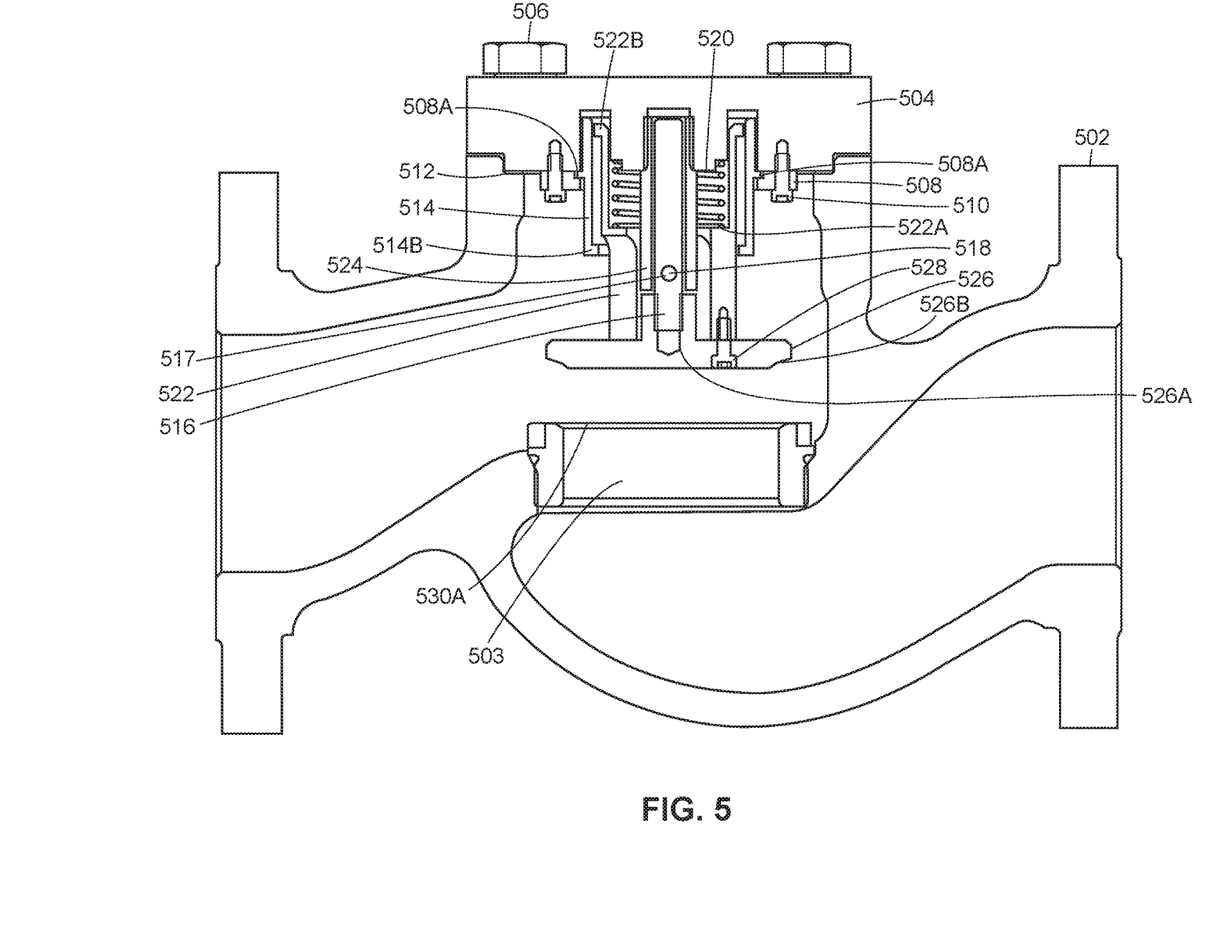

Turning to FIG. 5, a detailed schematic of an alternative valve 500 is provided. The valve 500 includes a valve body 502, an orifice 503, a bonnet 504, bonnet bolts 506, an outer guide clamp 508, outer guide clamp screws 510, a gasket 512, an outer guide 514, a stem 516, a stem opening 517, a set pin 518, a spring 520, a spring support 522, a stem guide 524, a disc or pallet 526, and pallet screws 528.

The valve body 502 and the bonnet 504 may be made of any number of suitable metals such as stainless steel (e.g., 316 stainless steel). The gasket 512 may be constructed of graphite, rubbers, or any other suitable materials and may be flame-resistant. The gasket 512 is disposed in an opening of the valve body 502 to create a seal to prevent leakage of pipe line fluid to the atmosphere. The bonnet 504 is coupled to the valve 502 via any number of bonnet bolts 506, which may be constructed of metals such as stainless steel (e.g., a combination 304/316 stainless steel yield material). Other examples are possible. The bonnet 504 is responsible for securing the remainder of the valve assembly to the valve 502.

The outer guide 514 may be a cylindrical tube-like structure adapted to couple to the bonnet and is adapted to prevent the spring support 522 from extending past a certain point and will be described in further detail below. The outer guide 514 may be made of any number of suitable metals such as stainless steel (e.g., 316 stainless steel). The outer guide 514 may be coupled to the bonnet 504 via the outer guide clamp 508 using the outer guide clamp screws 510. It is understood that any number of outer guide clamp screws 510 may be used to couple the outer guide 514 to the bonnet 504. The outer guide 514 may include a first notch or protrusion 514A which is adapted to contact a ledge 508A of the outer guide clamp. The outer guide clamp 508 and outer guide clamp screws 510 may be made of any number of suitable metals such as stainless steel (e.g., 316 stainless steel). Other examples are possible.

The spring 520 may be constructed of any suitable material such as a metal and/or metallic alloy (e.g., an austenite nickel-chromium-based superalloy commonly referred to as Inconel). Other examples are possible. The spring 520 is positioned against the bonnet 504 on a first end and is supported by a ledge 522A of the spring support 522 on a second end thereof. The spring support 522 may be made of any number of suitable metals such as stainless steel (e.g., 316 stainless steel). Other examples are possible.

Disposed inside a central portion of the spring 520 is a stem guide 524. The stem guide 524 may be made of any number of suitable metals such as stainless steel (e.g., 316 stainless steel) and may be coupled to the bonnet 504 via a threaded connection or other suitable methods. The stem guide 524 is adapted to guide the stem 516 disposed therein as the pallet 526 moves between a first and a second position. The stem guide 524 includes an opening 517 which serves as a catch or stop (such as those previously described herein) to restrict the stem 516 from moving.

The stem 516 and the pallet 526 may be constructed of any number of suitable materials such as stainless steel (e.g., 410 stainless steel or other suitable materials). The stem 516 may be coupled to the pallet 526 via any number of connections, such as a threaded connection, a press-fit connection via a central bore 526A in the pallet, or any other suitable method. The pallet 526 may be coupled to the spring support 522 via pallet screws 528 to ensure forces exerted by the spring 520 are evenly distributed on the pallet 526. As such, the pallet 526 may include a counter bore to create a planar surface.

The set pin 518 may be an elongated component constructed of any suitable material or metals such as a stainless steel. It is understood that the set pin 518 may be any suitable shape such as cylindrical or cuboidal. Other examples are possible. The set pin 518 may be coupled to the stem 516 via any number of approaches, including those previously described with reference to FIGS. 1-4. The set pin 518 is adapted to be inserted into the opening 517 of the stem guide 524. By inserting the set pin 518 into the opening, the assembly is locked in a first position whereby the spring 520 causes a downward force to be exerted on the set pin 518, thereby retaining the set pin 518 within the opening 517.

Upon the set pin 518 disengaging the opening 517 due to a deflagration event, the spring 520 causes the stem 516 and pallet 526 to move towards the orifice 503. This lateral movement is guided by the stem guide 524, spring support 522, and the outer guide 514 to ensure proper alignment of the pallet 526. The orifice 503 includes a parabolic surface 503A which is adapted to contact a corresponding parabolic surface 526B on the pallet 526 to ensure the pallet 526 maintains contact with the edge of the orifice 503 to seal and stop flow from traveling through the valve.

When it is desired to remove the valve assembly from the valve 502, the bonnet bolts 506 may be unbolted and the bonnet 504 and the assembly may be removed from the opening. During removal, a second notch 514B of the outer guide 514 may contact a corresponding notch 522B or lip of the spring support 522 to capture the entire assembly for removal.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A valve comprising:
    a valve body forming a channel defining a fluid flow path extending from an inlet port of the valve body to an outlet port of the valve body via a gallery of the valve body that is disposed between the inlet port and the outlet port, wherein the fluid flow path is adapted to allow a fluid to flow through the valve body in a first direction and a second direction opposite the first direction, the valve body further defining an opening disposed in communication with the gallery;
    a valve assembly adapted to be at least partially disposed through the opening and in the gallery of the valve body, the valve assembly including a valve spring and a valve disc, wherein the valve disc moves between a first position spaced from a valve seat of the valve body and a second position in contact with the valve seat; and a set pin having a central longitudinal axis and being adapted to be coupled to and at least partly supported by the valve assembly to maintain the valve assembly in the first position;

wherein the set pin is adapted to disengage a portion of the valve assembly when at least one of the set pin or the valve spring is directly contacted by a fluid located within the fluid flow path and traversing the fluid flow path in the second direction, thereby allowing the valve disc of the valve assembly to move to the second position.

2. The valve of claim 1, wherein the valve assembly further comprises a valve stem coupled to the valve disc, the valve stem comprising a first telescoping component having a central longitudinal axis, the valve assembly further comprising a second telescoping component having a central longitudinal axis aligned with the central longitudinal axis of the first telescoping component and forming at least one catch through a cylindrical surface thereof;

wherein the set pin is coupled to a portion of the first telescoping component and is at least partially retained by the catch of the second telescoping component to maintain the valve assembly in the first position.

3. The valve of claim 2, wherein the valve assembly comprises:

a valve bonnet at least partially covering the opening of the valve body;

the valve stem coupled to the valve bonnet;

the valve disc coupled to the valve stem; and wherein the valve spring is at least partially disposed between the valve bonnet and the valve disc, the valve spring exerting a force on at least one of the valve stem, the set pin, and the valve disc to urge the valve disc toward the second position and causes the valve disc to contact the valve seat upon the set pin disengaging the catch.

4. The valve of claim 3, wherein the set pin is adapted to disengage the catch when the valve assembly is contacted by the fluid to allow the valve disc of the valve assembly to move to the second position.

5. The valve of claim 4, wherein a force exerted on the valve assembly by the fluid traversing the fluid flow path in the second direction is sufficient to move the set pin to disengage the set pin from the catch.

6. The valve of claim 4, wherein upon the fluid traversing the fluid flow path in the second direction, the valve spring is adapted to expand to cause the set pin to disengage the catch.

7. The valve of claim 1, wherein the set pin comprises a cylindrical member being disposed at an angle relative to the central longitudinal axis.

8. The valve of claim 7, wherein the set pin comprises one of:
  (a) a spring pin,
  (b) a dowel pin, or
  (c) a fastener.

9. The valve of claim 8, wherein the set pin is inserted through at least one opening of the first telescoping component to couple the set pin to the first telescoping component.

10. The valve of claim 7, wherein the set pin is affixed to an outer surface of the first telescoping component to couple the set pin to the first telescoping component.

11. The valve of claim 2, wherein the catch comprises a blind hole disposed on an inner surface of the second telescoping component.

12. The valve of claim 2, wherein the valve assembly is adapted to be repeatedly secured in the first position by retaining the set pin by the catch of the second telescoping component.

13. A valve assembly, comprising:

a valve bonnet adapted to at least partially cover an opening of a valve body such that when the valve bonnet is coupled to the valve body, fluid is restricted from flowing through the opening of the valve body;

a valve stem coupled to the valve bonnet;

a valve disc coupled to the valve stem opposite the valve bonnet, the valve stem and the valve disc movable between a first position wherein the valve disc is spaced a first distance from the valve bonnet and a second position wherein the valve disc is spaced a second distance away from the valve bonnet, the second distance greater than the first distance;

a set pin having a central longitudinal axis, the set pin adapted to be coupled to and at least partly supported by the valve stem to maintain the valve stem and the valve disc in the first position;

a valve spring at least partially disposed between the valve bonnet and the valve disc, the valve spring exerting a force on at least one of the valve stem, the set pin, and the valve disc, the valve spring urging the valve stem and the valve disc into the second position; and wherein upon a fluid directly contacting at least one of the set pin or the valve spring, the set pin disengages a portion of the valve stem and the valve spring causes the valve stem and the valve disc to move to the second position.

14. The valve assembly of claim 13, wherein the valve stem comprises a first telescoping component having a central longitudinal axis, the valve stem further comprising a second telescoping component having a central longitudinal axis aligned with the central longitudinal axis of the first telescoping component and forming at least one opening on a cylindrical surface thereof, wherein the set pin is coupled to a portion of the first telescoping component and is retained by a catch of the second telescoping component to maintain the valve assembly in the first position.

15. The valve assembly of claim 13, wherein the central longitudinal axis of the set pin is adapted to be positioned at an angle relative to the central longitudinal axes of the first and second telescoping components when the set pin is at least partly supported by the valve stem.

* * * * *

UNITED STATES PATENT AND TRADEMARK OFFICE
CERTIFICATE OF CORRECTION

PATENT NO. : 10,274,099 B2
APPLICATION NO. : 15/040877
DATED : April 30, 2019
INVENTOR(S) : Mark A. Michnevitz et al.

Page 1 of 1

It is certified that error appears in the above-identified patent and that said Letters Patent is hereby corrected as shown below:

In the Specification

At Column 7, Line 62, "opening 130," should be -- opening 152, --.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*